United States Patent

Mogilevsky et al.

[11] Patent Number: 5,588,099
[45] Date of Patent: Dec. 24, 1996

[54] METHOD AND SYSTEM FOR AUTOMATICALLY RESIZING TABLES

[75] Inventors: Alex Mogilevsky; Kornel R. Marton, both of Redmond, Wash.

[73] Assignee: Microsoft Corporation, Redmond, Wash.

[21] Appl. No.: 299,932

[22] Filed: Sep. 1, 1994

[51] Int. Cl.⁶ .................................... G06T 3/00
[52] U.S. Cl. .................. 395/139; 395/133; 395/326
[58] Field of Search ..................... 395/139, 133, 395/140, 141, 145–149, 155, 156, 161, 117, 118; 382/175, 229; 364/419.1, 419.17, 419.19

[56] References Cited

U.S. PATENT DOCUMENTS

| | | | |
|---|---|---|---|
| 5,379,372 | 1/1995 | Wu | 395/148 |
| 5,420,695 | 5/1995 | Ohta | 395/146 |
| 5,450,536 | 9/1995 | Rosenberg et al. | 395/148 |

OTHER PUBLICATIONS

*User's Guide 1–Microsoft Excel: Getting Started, Worksheet Basics, Databases, Charts, Grsphics, Printing, Keyboard Shortcuts,* Microsoft Corporation, 1992, pp. 232–233.

Primary Examiner—Almis R. Jankus
Attorney, Agent, or Firm—Seed And Berry LLP

[57] ABSTRACT

A computer system for automatically resizing a table. A table includes various columns. Each column has a column width and an associated width of the longest data in the column. In a preferred embodiment, the system initially resizes the width of each unwrapped column to the width of its longest data. If the sum of the column widths after resizing is greater than the margin width, then the system proportionally decreases the column width of each column so that the sum of the column width is equal to the margin width. If, however, the sum of the column width is less than the margin width, the system proportionally increases the column width of each wrapped column so that the sum of the column widths is equal to the margin width.

26 Claims, 9 Drawing Sheets

110

| 113 | formal language (111) | A combination of a syntax and semantics that completely defines a computer language. (112) |
|---|---|---|
| 114 | formal logic | A study of logical expressions, sequences, and overall construction of a valid argument, without regard to the truth of the argument. |
| 115 | form feed | See carriage return |
| 116 | Forth | A programming language. |

120

| 123 | formal language (121) | A combination of a syntax and semantics that completely defines a computer language. (122) |
|---|---|---|
| 124 | formal logic | A study of logical expressions, sequences, and overall construction of a valid argument, without regard to the truth of the argument. |
| 125 | form feed | See carriage return |
| 126 | Forth | A programming language. |

130

| 133 | formal language (131) | A combination of a syntax and semantics that completely defines a computer language. (132) |
|---|---|---|
| 134 | formal logic | A study of logical expressions, sequences, and overall construction of a valid argument, without regard to the truth of the argument. |
| 135 | form feed | See carriage return |
| 136 | Forth | A programming language. |

|     | 511 | 512 | 513 | 514 |
|-----|-----|-----|-----|-----|
| 510 | a a a a | b b b b b b<br>b b b b b b<br>b b b | c c c<br>c c c<br>c | d d d d<br>d |

|     | 521 | 522 | 523 | 524 |
|-----|-----|-----|-----|-----|
| 520 | a a a a | b b b b b b b b b b b b b b | c c c c c c c | d d d d d |

|     | 531 | 532 | 533 | 534 |
|-----|-----|-----|-----|-----|
| 530 | a a a a | b b b b b b<br>b b b b b b<br>b b b | c c c<br>c c c<br>c | d d d d<br>d |

|     | 541 | 542 | 543 | 544 |
|-----|-----|-----|-----|-----|
| 540 | a a a a | b b b b b b b b b b b b<br>b b | c c c c c<br>c | d d d d d |

METHOD AND SYSTEM FOR AUTOMATICALLY RESIZING TABLES

TECHNICAL FIELD

The invention relates generally to methods in a computer system for automatically resizing a table and, more specifically, to methods and systems for automatically resizing a table to fit with a specified margin width.

BACKGROUND OF THE INVENTION

Computer systems represent data in a variety of formats. One commonly use format is a table format. With a table format, data is organized into rows and columns, and data is stored in the cells of the table. The cells of a table are formed by each intersection of a row and a column. The table format is used to represent data in many computer application programs including spreadsheet, database, and word processing programs.

FIG. 1 illustrates data that is shown in a table format. Table 110 has two columns 111 and 112 and four rows 113–116. Table 110 has eight cells that are at the intersections of the columns and rows. Each cell is identified by its corresponding row and column number. For example, cell 113:111 is the cell at the intersection of row 113 and column 111. In this example, the cells in column 111 contain words or phrases, and the cells in column 112 contain the definitions for the words or phrases. Each column in a table has a column width that may be specified in inches or in number of characters (of a fixed-width font). For example, column 111 is 9 characters in width and column 112 is 23 characters in width. Each row has a row height that may contain several lines of data. For example, row 113 has a row height of 4 lines. Since the phrase "formal language" at cell 113:111 is 15 characters wide (including the space between the words), the phrase cannot fit within one line of the cell. Therefore, the phrase is wrapped to the second line of the cell. On the other hand, since the phrase "form feed" at cell 115:111 is 9 characters wide, the phrase fits within one line of the cell. When the data (typically text) within a cell is wider than the column, the column is referred to as wrapped.

Typical application programs that support the table format allow a user to manipulate the format of the table. For example, a user may add or delete rows and columns to and from the table. A user may also change the width of (resize) the columns of the table. A user can resize column 111, for example, by selecting the border between column 111 and column 112 and moving the border to the right. This movement increases the width of column 111 and decreases the width of column 112 as shown in table 120, but the overall table width remains the same. Although the column 121 is not wrapped (is unwrapped), each row in the table has increased to contain more lines to accommodate the wrapped text in column 122, which is now narrower.

A user may then want to increase width of table 120 so that column 122 is wider. A user may increase the width of column 122 by selecting the right border of column 122 and moving the border to the edge of the display or page. For example, line 140 shows the margin widths for the page. Table 130 shows table 120 after column 122 has been increased in width to be equal to the margin width.

If the user then decides to remove row 133 from table 130, column 131 will be wider than necessary to accommodate the longest text in the column. That is, since the longest text would then be the phrase "formal logic," the user would then select the border between column 131 and column 132 and move the border to the left. This would decrease the width of column 131 and increase the width of column 132.

A user typically needs to manually change the width of the table and each column within the table as text is added to and deleted from the table or columns and rows are added to and deleted from the table. Moreover, if the margin width is changed, the various column widths would need to be manually resized to fit within the new margin width. One prior system for automatically resizing the column widths of a table simply unwraps each column. That is, the prior system determines the width of the longest text in each column and sets the width of that column to the width of the longest text. For example, such a prior system would automatically resize table 110 by setting the width of column 111 to 15 characters, which is the length of the text "formal language" in cell 113:111, and by setting the width of column 112 to 133 characters, which is the length of the descriptive text in cell 114:112. Such automatic resizing of the table is undesirable because the resized table width extends well beyond the margin width.

SUMMARY OF THE INVENTION

The present invention is a computer system for automatically resizing a table. A table includes various columns. Each column has a column width and an associated width of the longest data in the column. In a preferred embodiment, the system initially resizes the width of each unwrapped column to the width of its longest data. If the sum of the column widths after resizing is greater than the margin width, then the system proportionally decreases the column width of each column so that the sum of the column width is equal to the margin width. If, however, the sum of the column width is less than the margin width, the system proportionally increases the column width of each wrapped column so that the sum of the column widths is equal to the margin width.

BRIEF DESCRIPTION OF THE DRAWINGS

FIG. 1 illustrates data that is shown in table format.

FIG. 4 is a block diagram illustrating automatic table resizing when the unwrapping of the columns is insufficient to resize the table.

FIG. 5 is another block diagram illustrating automatic table resizing when the unwrapping of the columns is insufficient to resize the table.

DETAILED DESCRIPTION OF THE INVENTION

The present invention provides methods and systems for automatically resizing columns of a table based on a specified margin width. In a preferred embodiment, the automatic resizing system inputs the original column widths of a table, the width of the longest text in each column, and the margin width and outputs a resized column width for each column. The system resizes the table in a way that preferably unwraps columns and that preferably ensures that the resulting table width is within the margin width. The system initially attempts to increase or decrease the width of each column so that the longest text within each column fits exactly within the column width. If, however, the resulting table width would be greater than the margin width, then the system uses additional automatic resizing techniques to ensure the resulting table width is within the margin width. These additional resizing techniques preferably unwrap columns and preferably ensure that an unwrapped column is no wider than its longest text. To accomplish this, the system sets the column width to the original column width if the column is wrapped and sets the column width to exactly fit the longest text in the column if the column is unwrapped. This effectively decreases the width of columns that were originally too wide for their longest text. If the resulting table width would be wider than the margin width, the system then proportionally reduces the width of each column so that the resulting table width is within the margin width. If the resulting table width would be less than the margin width, the system then proportionally adjusts the width of each column, except that width of a column is no wider than its longest text string.

Figure 2:
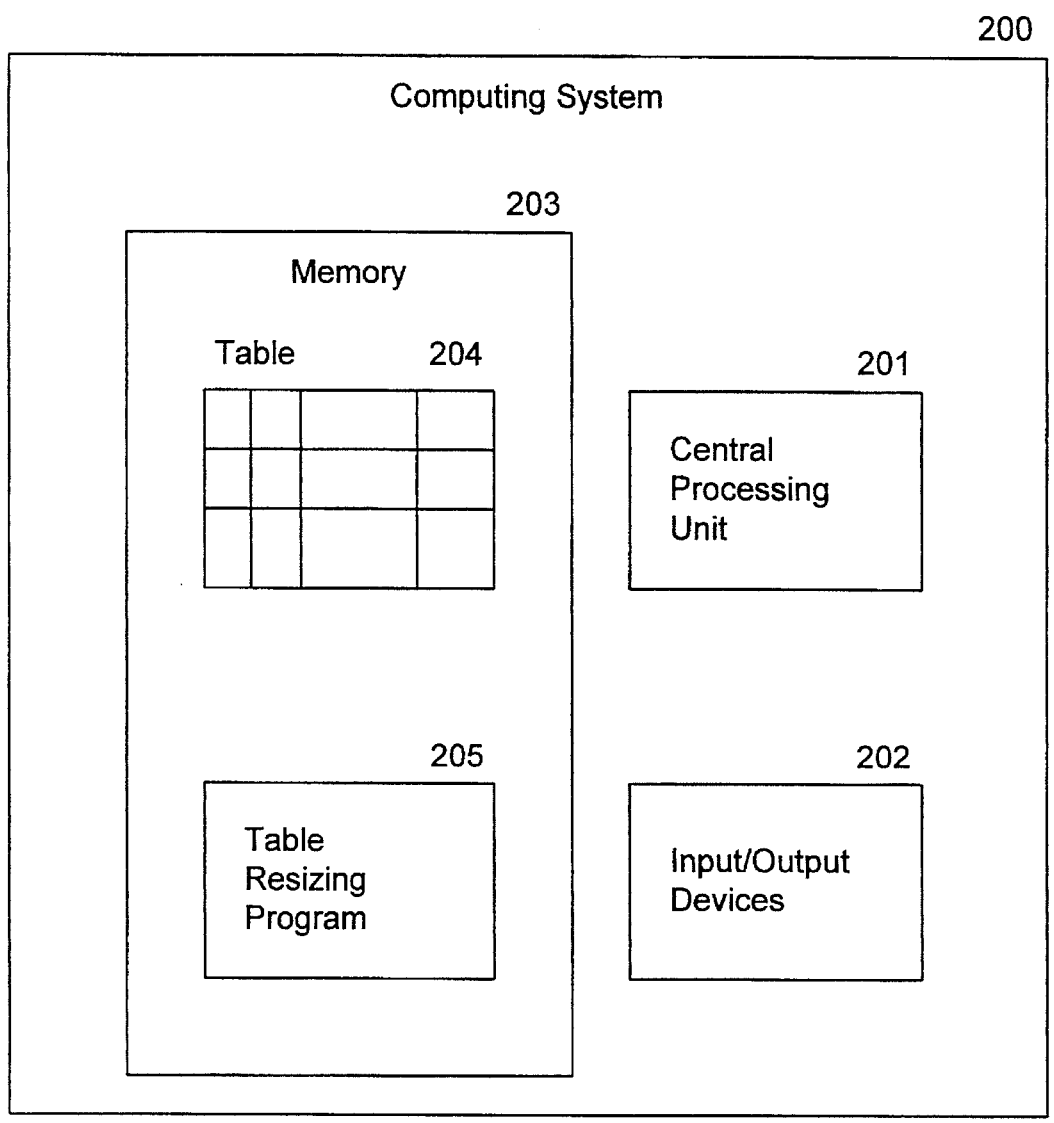
FIG. 2 is a block diagram illustrating a computing system that implements the methods and systems of a preferred embodiment of the present invention.

FIG. 2 is a block diagram illustrating computing system 200 that implements the methods and systems of a preferred embodiment of the present invention. The computing system 200 comprises a central processing unit 201, input/output devices 202, and a memory 203. The memory contains a table 204 that is to be resized and a table resizing program 205 that implements the preferred methods. The present invention is described in terms of a preferred embodiment, which is a computer program that executes on a computer system. One skilled in the art would appreciate that the methods of the present invention may be practiced on processing systems with varying architectures and on systems with hardwired logic. A preferred embodiment is implemented as an automatic table resizing feature in a word processing program.

Figure 3:
FIG. 3 is a block diagram illustrating automatic table resizing when the setting of the width of each column to the longest text in the column is sufficient to resize the table.

FIGS. 3, 4, and 5 illustrate the resizing of various tables using the methods of the present invention. FIG. 3 is a block diagram illustrating automatic table resizing when the setting of the width of each column to the longest text in the column is sufficient to resize the table. Table 310 is a table before it is automatically resized; table 320 is table 310 after automatic resizing; and line 330 shows the margin width. Table 310 comprises columns 311–315. Columns 311 is a column that exactly fits its longest text. That is, if any more text is added to a cell with the longest text (e.g., cell 316:311), then that cell would wrap to the next line. Column 312 is a column with wrapped text. Since all the text in the cell 316:312 does not fit within a single line of the column, the text wraps to the next line. Columns 313 and 315 are blank columns. That is, the columns do not contain any text. Column 314 is a column that is too wide. That is, the column is wider that the longest text in the column. The longest text in the column is in cell 316:314. When resizing a table, the system tentatively sets the width of each column so that it exactly fits its longest text. In this example, column 311 is tentatively left unchanged because it exactly fits its longest text. The system tentatively increases the width of column 312 as shown in column 322 so that it exactly fits its longest text. The system tentatively decreases the width of column 314 as shown in column 324 so that it exactly fits its longest text. And, the system tentatively leaves the width of columns 313 and 315 unchanged as shown in columns 323 and 324 since they are blank columns. Since the tentative table width (i.e., the sum of the tentative column widths) is less than the margin width as shown by line 330, the system uses the tentative column widths as the resized column widths. In an alternate embodiment, when the tentative table width is less than the margin width and the table contains blank columns, then the width of the blank columns are increased in proportion to their original widths so that the tentative table width is equal to the margin width. In yet another alternate embodiment, if the tentative table width is greater than the margin width and the table contains blank columns, then the widths of the blank columns are decreased so that, if possible, the tentative table width is equal to the margin width.

FIG. 4 is a block diagram illustrating automatic table resizing when the unwrapping of the columns is insufficient to resize the table. The automatic resizing is insufficient because the resulting table width would be wider than the margin width. Table 410 is a table with its original column widths, that is, before automatic resizing; table 420 is table 410 after its columns have been unwrapped; table 430 is table 410 after the columns that are too wide are resized to exactly fit the longest text; table 440 is the final resized table; and line 450 shows the margin width. Table 410 comprises column 411 that is too wide and column 412 that is wrapped. When resizing a table, the system initially and tentatively sets the width of each column so that it exactly fits its longest text. However, since the tentative table width as shown is table 420 is greater than the margin width, this tentative table resizing is not sufficient. When the initial resizing is not sufficient, the system then tentatively sets the width of each column that is originally too wide so that it exactly fits its longest text. In table 410, column 411 is too wide so its width is tentatively set to the width of its longest text as shown in column 431 of table 430. The system tentatively sets the width of column 432 to its original width as shown in column 412. Since the tentative table width as shown in table 430 is wider than the margin width, the system proportionally decreases the width of each column so that the final resized table width is equal to the margin width as shown in table 440. The columns are resized in proportion to their original widths.

FIG. 5 is another block diagram illustrating automatic table resizing when the unwrapping of the columns is insufficient to resize the table. Table 510 is a table before automatic resizing; table 520 is table 510 after its columns have been unwrapped; table 530 is table 510 after the columns that are too wide are set to exactly fit the longest text; table 540 is the final resized table; and line 550 shows the margin width. Table 510 comprises column 511 that is too wide and columns 512–514 that are wrapped. When resizing a table, the system initially and tentatively sets the width of each column so that it exactly fits its longest text. However, since the tentative table width as shown in table 520 is greater than the margin width, this tentative table resizing is not sufficient. When the initial resizing is not sufficient, the system then tentatively sets the width of each column that is originally too wide so that it exactly fits its longest text. In table 510, column 511 is too wide so its width is tentatively set to the width of its longest text as shown in column 531. The system tentatively sets the width of columns 532–534 to their original widths as shown in columns 512–514. Since the tentative table width as shown in table 530 is less than the margin width, the system proportionally increases the width of each wrapped column so that the resized table width is equal to the margin width as shown in table 540. If a column becomes too wide when its width is proportionally increased, the system sets the column width so that it exactly fits its longest text. The system then distributes the portion of the column width that is too wide to each wrapped column. This system iteratively repeats this process proportionally increasing the widths of the unwrapped columns until the resized table width is equal to the margin width.

Figure 6:
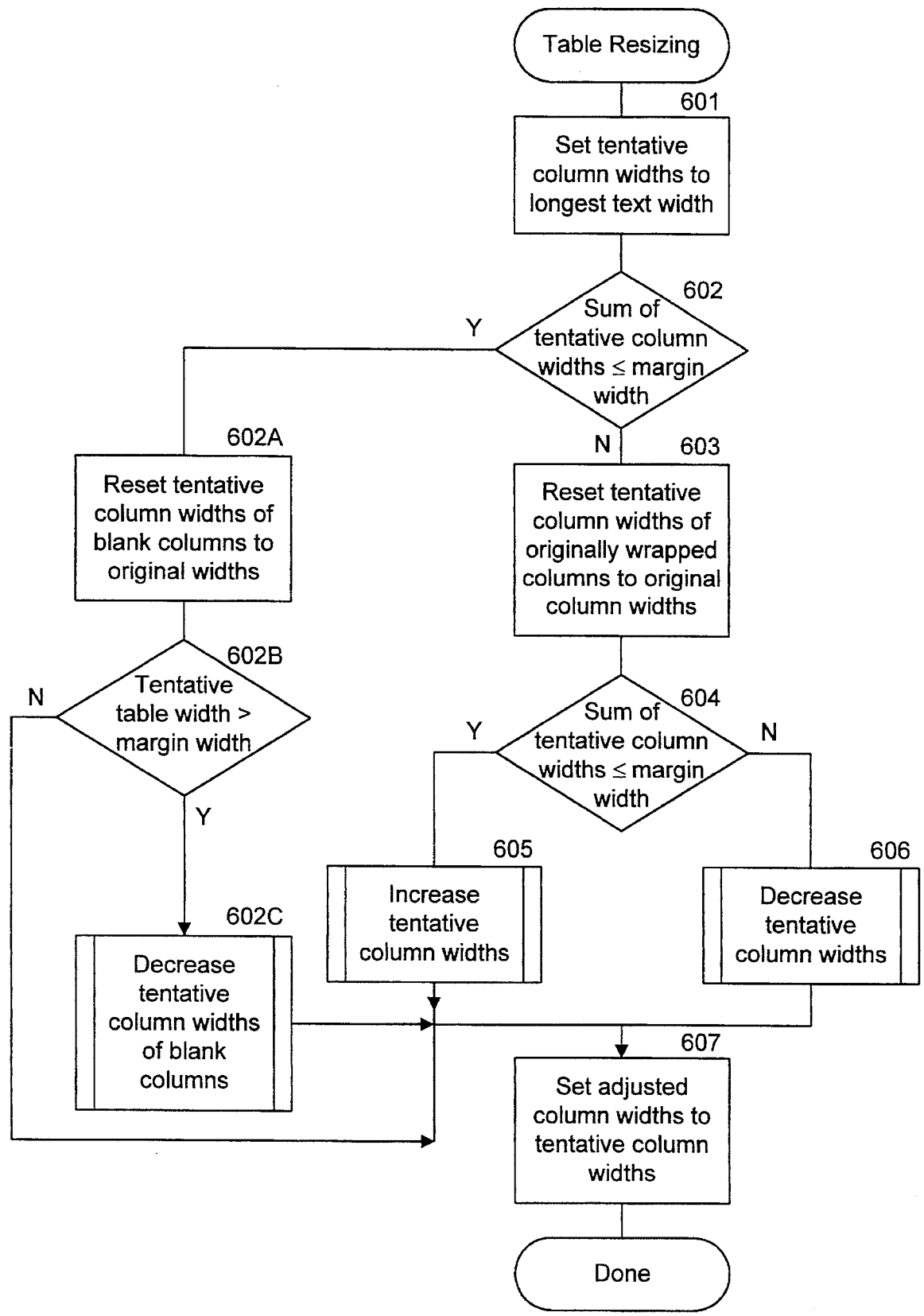
FIG. 6 is a flow diagram of table resizing methods.
Figure 7:
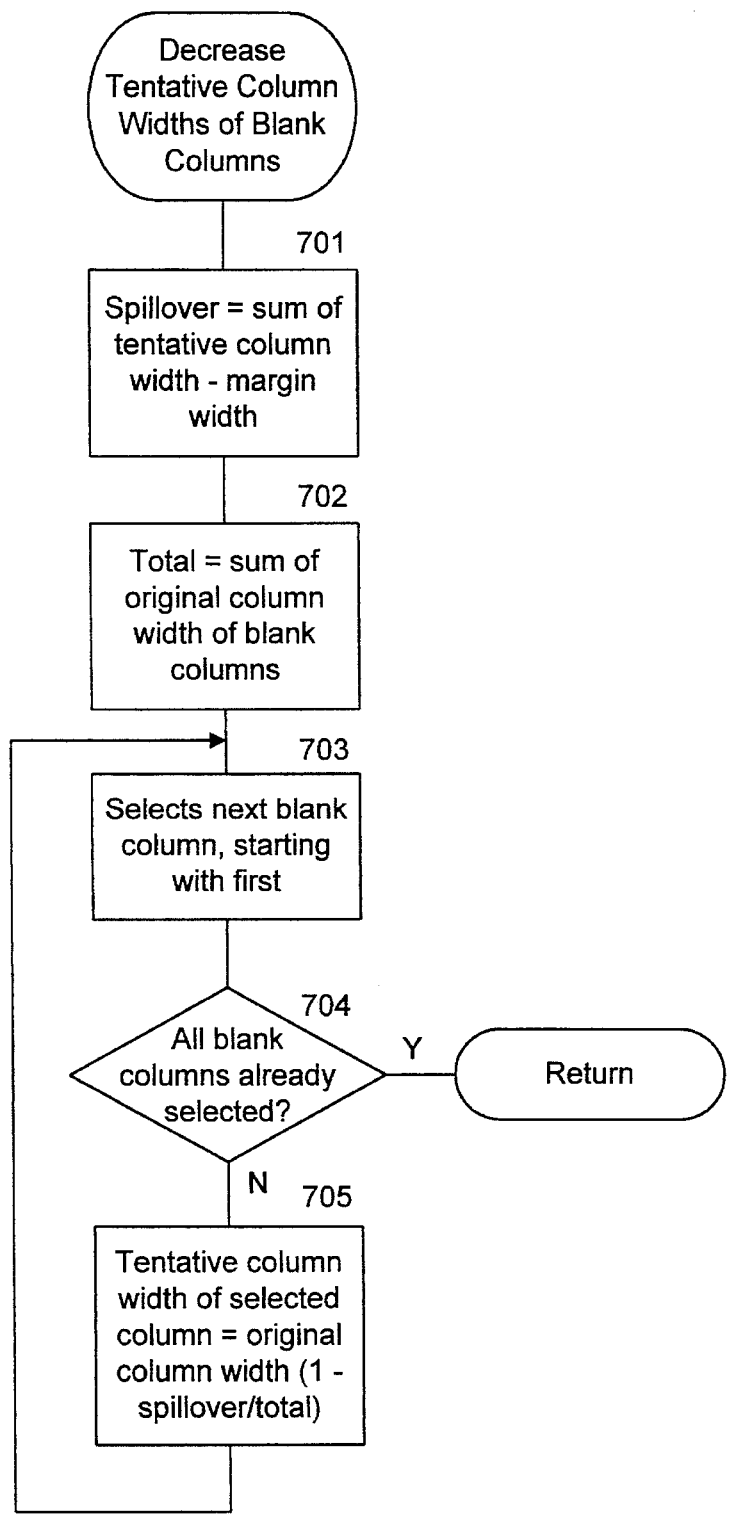
FIG. 7 is a flow diagram of a function for tentatively setting the column widths of blank columns.

FIG. 6 is a flow diagram illustrating the table resizing methods. This table resizing system receives the original width of each column, the width of the longest text (or data) in each column, and the margin width to which the table is to be adjusted. The system returns the adjusted (resized) width of each column. In step 601, the system sets the tentative column width of each column to the width of the longest text in the column. The tentative width of any blank column is preferably set to the minimum column width or zero. In step 602, if the sum of the tentative column widths is less than or equal to the margin width, then the system continues at step 602A, else the system continues at step 603. In steps 602A through 602C, the system effectively expands the width of blank columns up to their original width so that the tentative table column width is equal to the margin width. In step 602A, the system resets the tentative column width of each blank column to its original width. In step 602B, if the tentative column width is now greater than the margin width, then the system proportionally decreases the tentative widths of the blank columns in step 602C, as shown in FIG. 7. The system then continues at step 607. In step 603, the system resets the tentative column width of each column that was originally wrapped to its original column width. Thus, the tentative column widths correspond to the original column widths, except that the width of columns that are too wide are decreased to exactly fit their longest text. In step 604, if the sum of the tentative column widths is less than or equal to the margin width, then the system continues at step 605, else the system continues at step 606. In step 605, the system increases the tentative column widths so that the sum of the tentative column widths is equal to the margin width and continues at step 607. In step 606, the system decreases the tentative column widths so that the sum of the tentative column widths is equal to the margin width and continues at step 607. In step 607, the system sets the final adjusted column widths to the tentative column widths and is done.

FIG. 7 is a flow diagram of a function for tentatively setting the column widths of blank columns. When the sum of the tentative column widths is greater than the margin width, the system sets the column width of blank columns to decrease the tentative table width to the margin width. To decrease the tentative column width of blank columns, the system uses the tentative column widths, the original column widths, and the margin width. The system decreases the tentative column width of each blank column by an amount that is proportional to its original column width. In step 701, the system sets the spillover which is the difference between the sum of the tentative column widths and the margin width. In step 702, the system totals the original column widths of the blank columns. Otherwise, in steps 703 through 705, the function loops setting the tentative column width of each blank column in proportion to its original column width relative to the width of the other blank columns. In step 703, the system selects the next blank column starting with the first blank column. In step 704, if all the blank columns have already been selected, then the system returns, else the system continues at step 705. In step 705, the system sets the tentative column width of the selected blank column equal to its original column width minus the spillover times its original column width divided by the total of the original column width of the blank columns and loops to step 703 to select the next blank column.

Figure 8:
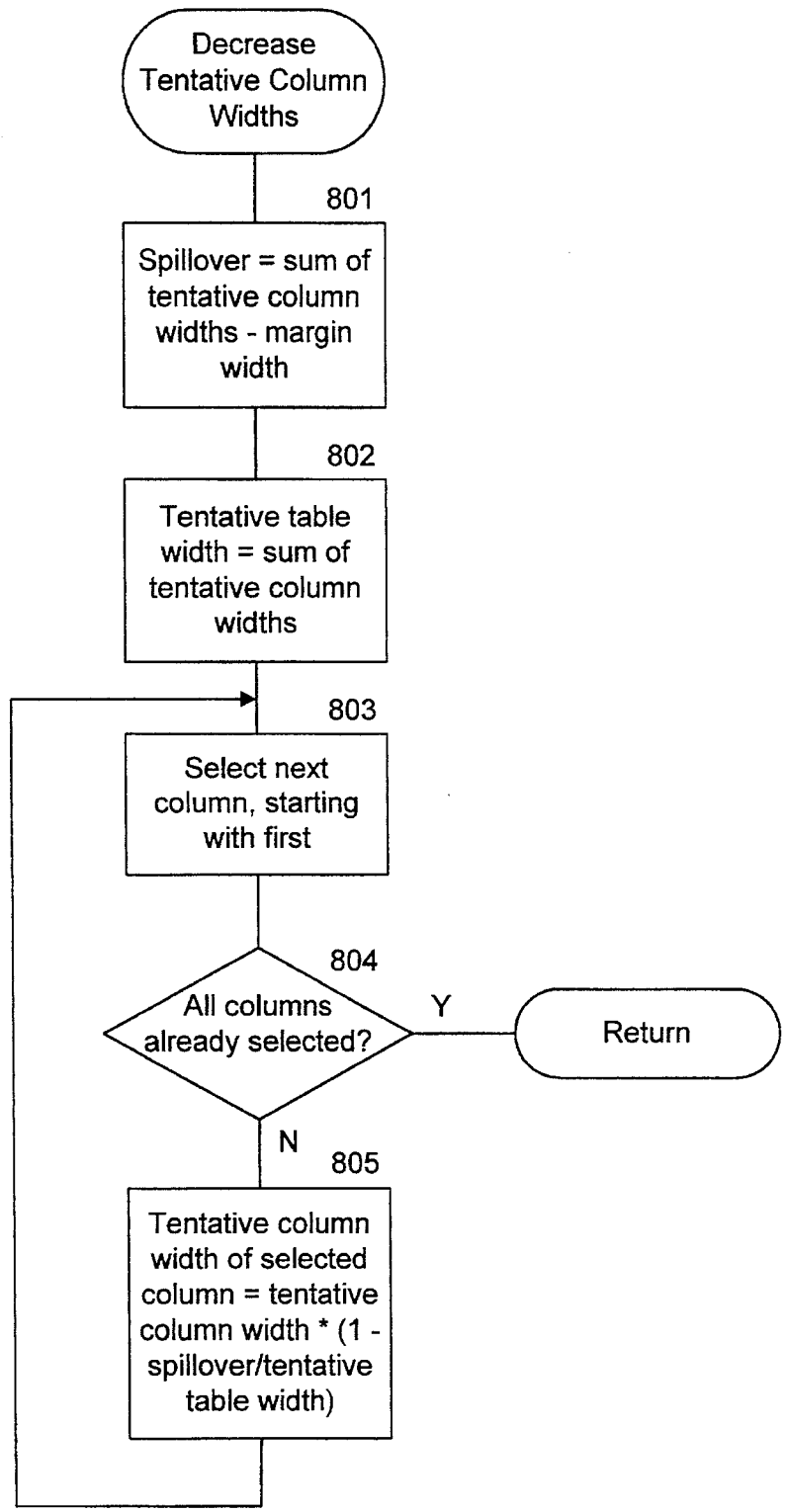
FIG. 8 is a flow diagram of a function for decreasing the tentative column widths.

FIG. 8 is a flow diagram of a function for decreasing the tentative column widths. The system decreases the tentative column widths so that the tentative table width is equal to the margin width. The system decreases the tentative widths of each column in proportion to the original width of the column to the original table width. To decrease the tentative column width, the system may use the original widths, the tentative column widths, and the margin width. In step 801, the system determines the amount of spillover, which is the difference between the tentative table width and the margin width. The spillover represents the amount of space that needs to be removed from the tentative column widths to make the tentative table width equal to the margin width. In step 802, the system determines the tentative table width, which is the sum of the tentative column widths. In steps 803 through 805, the system loops decreasing the tentative width of each column. In step 803, the system selects the next column starting with the first column. In step 804, if all the columns have already been selected, then the system returns, else the system continues at step 805. In step 805, the system decreases the tentative column width of the selected column by a portion of the spillover that is proportional to the tentative column width relative to the tentative table width. One skilled in the art would appreciate that other proportions could be used such as the original column width relative to the original table width.

Figure 9:
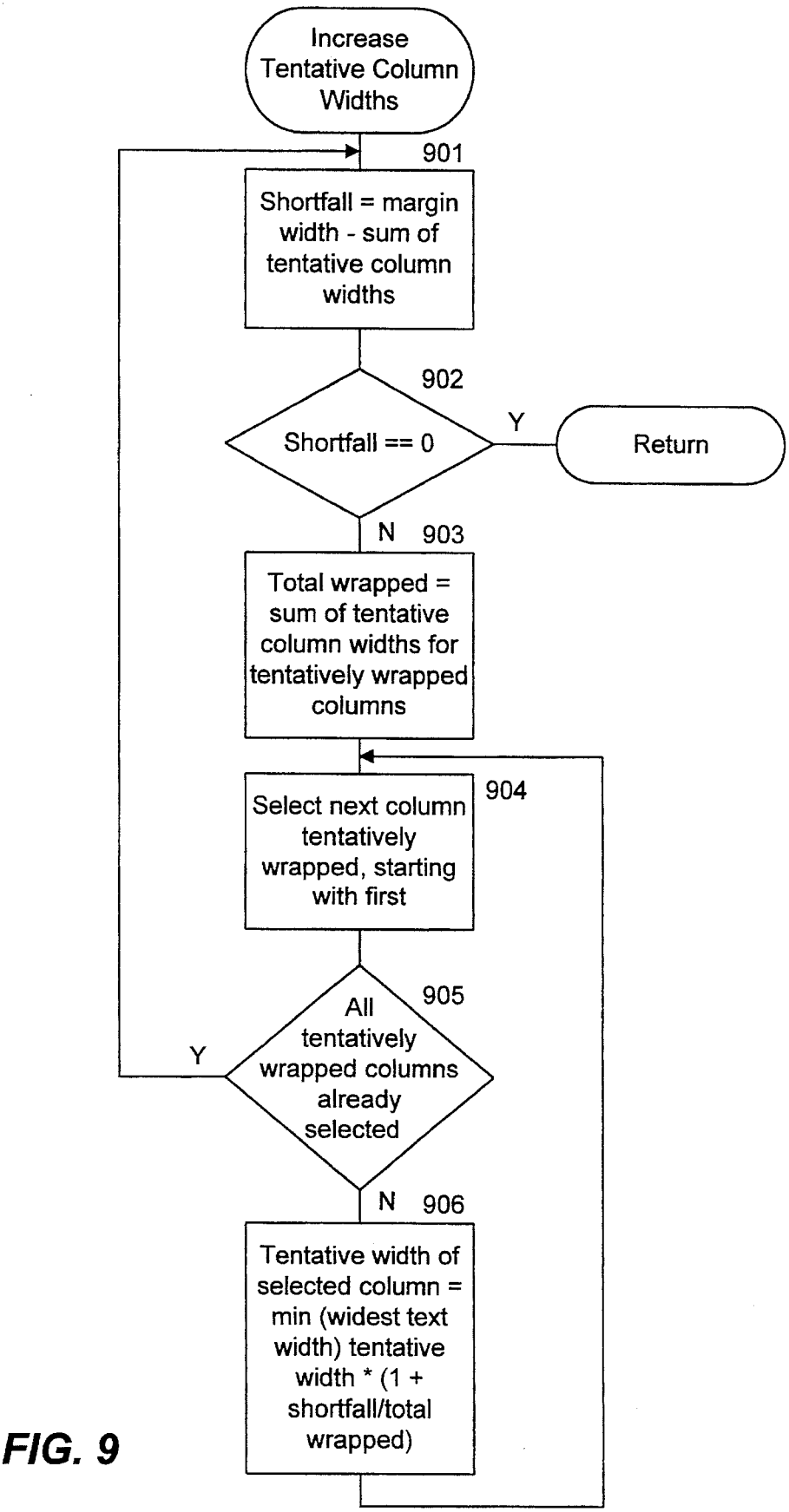
FIG. 9 is a flow diagram of a function for increasing the tentative column widths.

FIG. 9 is a flow diagram of a function for increasing the tentative column widths. The system increases the tentative column widths of the columns so that the tentative table width equals the margin width. The system proportionately increases the tentative column width of columns that are tentatively wrapped. The proportions are based on the tentative column width relative to the total of the tentative column widths of the columns that are tentatively wrapped. To increase the tentative column widths, the system may use the tentative column widths, the widths of the longest text for each column, and the margin width. In step 901, the system sets the shortfall, which is the difference between the margin width and the tentative table width. The shortfall represents the amount of space that needs to be added to the tentative column widths to make the tentative table width equal to the margin width. The system iteratively distributes the shortfall by increasing the tentative column width of unwrapped columns. Since a tentative column width is maximally limited to exactly fit its longest text, not all of the shortfall is necessarily distributed during each iteration. Eventually, however, the shortfall is distributed during successive iterations. Specifically, in step 902, if the shortfall is equal to zero, then the system returns, else the system continues at step 903. In step 903, the system determines the total of all the tentative column widths for columns that are tentatively wrapped. In steps 904 through 906, the system loops increasing the tentative column width of each column that is tentatively wrapped. In step 904, the system selects the next column that is tentatively wrapped starting with the first column. In step 905, if all the columns that are tentatively wrapped have already been selected, then the system loops to step 901 to determine if the tentative table width is equal to the margin width, else the system continues at step 906. In step 906, the system sets the tentative width of the selected column to the minimum of the longest text in the column and the tentative column width increased by an amount of the shortfall that is in proportion to the tentative column width relative to the sum of tentative column widths of the columns that are tentatively wrapped. The system then loops to step 904 to select the next wrapped column.

In an alternate embodiment, the system resizes the table using only selected columns of the table. The column width of the unselected columns is left unchanged. The selected columns can be resized by decreasing the effective margin width by the total width of the unselected columns.

Although the methods and systems of the present invention have been disclosed and described with respect to preferred embodiments, it is not intended that the present invention be limited to such embodiments. Rather, the present invention is intended to include all legally equivalent embodiments. Based on this disclosure, modification within the spirit of this invention will be apparent to those skilled in the art. The scope of the present invention is defined by the claims that follow.

We claim:

1. A method in a computer system for automatically resizing a table, the table having a plurality of columns, each column having a column width and a width of longest data, the method comprising the steps of:

for each column in which the column width is greater than the width of the longest data, setting the column width to the width of the longest data; and when a sum of the column widths of all the columns is greater than a specified width, proportionally decreasing the column width of each column so that the sum of the column widths of all the columns is equal to the specified width.

2. The method of claim 1 wherein the step of proportionally decreasing the column width decreases the column width of each column in proportion to the column width relative to the sum of the column widths of all the columns.

3. The method of claim 1 wherein the step of proportionally decreasing the column width includes the steps of:

determining a spillover amount by subtracting the specified width from the sum of the column widths of all the columns;

determining a total column width by summing the column width of all the columns; and for each column, setting the column width to the column width minus the column width times the determined spillover amount divided by the determined total column width.

4. A method in a computer system for automatically resizing a table, the table having a plurality of columns, each column having a column width and a width of longest data, the method comprising the steps of:

for each column which contains data and in which the column width is greater than the width of the longest data, setting the column width to the width of the longest data;

when a sum of the column widths of all the columns is greater than a specified width, decreasing the column width of blank columns so that the sum of the column widths of all the columns is equal to the specified width; and when the decreased column widths of the blank columns are not such that the sum of the column widths of all the columns is equal to the specified width, decreasing the column width of each column so that the sum of the column widths of all the columns is equal to the specified width.

5. A method in a computer system for automatically resizing a table, the table having a plurality of columns, each column having a column width and a width of longest data, the method comprising the steps of:

for each column in which the column width is greater than the width of the longest data, setting the column width to the width of the longest data; and when a sum of the column widths of all the columns is less than a specified width, proportionally increasing the column width of each column so that the sum of the column widths of all the columns is equal to the specified width.

6. The method of claim 5 wherein the step of proportionally increasing the column width increases the column width of each column in proportion to the column width relative to the sum of the column widths of all the columns.

7. The method of claim 5 wherein the step of proportionally increasing the column width increases the column width to no wider than the width of the longest data.

8. The method of claim 5 wherein the step of proportionally increasing the column width includes the steps of:

determining a shortfall amount by subtracting the sum of the column widths of all the columns from the specified width;

determining a total column width by summing the column width of all the columns in which the column width is less than the width of the longest data; and for each column in which the column width is less than the width of the longest data, setting the column width to the column width plus the column width times the determined shortfall amount divided by the determined total column width.

9. The method of claim 8 wherein the step of setting the column width includes the step of setting the column width to the minimum of the width of the longest data of the column and the column width plus the column width times the determined shortfall amount divided by the determined total column width.

10. The method of claim 9 including the step of repeating the steps of determining a shortfall amount, determining a total column width, and setting the column width until the determined shortfall amount is equal to zero.

11. A method in a computer system for automatically resizing a table, the table having a plurality of columns, each column having a column width and a width of longest data, the method comprising when a sum of the column widths of all the columns is less than a specified width, proportionally increasing the column width of each column in which the width of the longest data is wider than the column width so that the sum of the column widths of all the columns is equal to the specified width and so that each increased column width is less than or equal to the width of the longest data of the column.

12. A method in a computer system for automatically resizing a table, the table having a plurality of columns, each column having a column width and a width of longest data, the method comprising the steps of:

for each column in which the column width is greater than the width of the longest data, setting the column width to the width of the longest data;

when a sum of the column widths of all the columns is greater than a margin width, proportionally decreasing the column width of each column so that the sum of the column widths of all the columns is equal to the margin width; and when the sum of the column widths of all the columns is less than the margin width, proportionally increasing the column width of each column so that the sum of the column widths of all the columns is equal to the margin width.

13. The method of claim 12 wherein the step of proportionally decreasing the column width decreases the column width of each column in proportion to the column width relative to the sum of the column widths of all the columns.

14. The method of claim 12 wherein the step of proportionally increasing the column width increases the column width of each column in proportion to the column width relative to the sum of the column widths of all the columns.

15. The method of claim 12 wherein the step of proportionally increasing the column width increases the column width to no wider than the width of the longest data.

16. A computer system for automatically resizing a table, the table having a plurality of columns, each column having a column width and a width of longest data, the system comprising:
   means for setting the column width to the width of the longest data for each column in which the column width is greater than the width of the longest data;
   means for proportionally decreasing the column width of each column so that the sum of the column widths of all the columns is equal to a margin width when a sum of the column widths of all the columns is greater than the margin width; and
   means for proportionally increasing the column width of each column so that the sum of the column widths of all the columns is equal to the margin width when the sum of the column widths of all the columns is less than the margin width.

17. A computer system for automatically resizing a table, the table having a plurality of columns, each column having a column width and a width of longest data, the system comprising a table resizing program that operates when a sum of the column widths of all the columns is less than a margin width to proportionally increase the column width of each column in which the width of the longest data is wider than the column width so that the sum of the column widths of all the columns is equal to the margin width and so that each increased column width is less than or equal to the width of the longest data of the column.

18. A method in a computer system for automatically resizing a table, the table having a plurality of columns, each column having a column width and a width of longest data, the method comprising:
   for each column in which the column width is different than the width of the longest data,
      setting the column width to the width of the longest data; and
      unwrapping any wrapped data contained in the column; and
   when a sum of the column widths of all the columns is less than a specified width, increasing the column width of each blank column so the sum of the column widths of all the columns is equal to the specified width.

19. The method of claim 18 wherein the step of increasing the column width of each blank column increases the column width of each blank column in proportion to the original column width of the blank column relative to the sum of the original column widths of all the blank columns.

20. The method of claim 18 wherein the step of increasing the column width of each blank column comprises:
   determining a shortfall amount equal to the specified width less the sum of the column widths of all the columns; and
   for each blank column, setting the column width equal to the original column width of the blank column times the determined shortfall amount divided by the sum of the original column widths of all the blank columns.

21. A method in a computer system for automatically resizing a table, the table having a plurality of columns, each column having a column width and a width of longest data, the method comprising:
   for each column in which the column width is different than the width of the longest data,
      setting the column width to the width of the longest data; and
      unwrapping any wrapped data contained in the column; and
   when a sum of the column widths of all the columns is greater than a specified width,
      rewrapping the unwrapped data contained in each column that originally contained wrapped data; and
      resetting the column width of each column containing the rewrapped data to the original column width of the column.

22. The method of claim 21 further comprising:
   when the sum of the column widths of all the columns is less than the specified width, proportionally increasing the column width of each column containing the rewrapped data so that the sum of the column widths of all the columns is equal to the specified width and so that each increased column width is no wider than the width of the longest data of its respective column.

23. The method of claim 22 wherein the step of proportionally increasing the column width of each column containing the rewrapped data comprises:
   (a) determining a shortfall amount equal to the specified width less the sum of the column widths of all the columns; and
   (b) for each column containing wrapped data,
      determining an increase in the column width of the column equal to the original column width of the column times the determined shortfall amount divided by the sum of the original column widths of all the columns containing wrapped data;
      setting the column width of the column equal to the original column width of the column plus the determined increase in the column width of the column; and
      when the column width of the column is at least equal to the width of the longest data of the column,
         setting the column width of the column to the width of the longest data of the column; and
         unwrapping the wrapped data contained in the column; and
   (c) when the wrapped data contained in at least one of the columns containing wrapped data is unwrapped in step (b),
      setting the column width of each column still containing wrapped data to the original column width of its respective column; and
      repeating steps (a) and (b).

24. A computer-readable storage medium upon which is stored a program for controlling a computer system to automatically resize a table, the table having a plurality of columns, each column having a column width and a width of longest data by the steps of:
   for each column in which the column width is different than the width of the longest data,
      setting the column width to the width of the longest data; and unwrapping any wrapped data contained in the column; and when a sum of the column widths of all the columns is greater than a specified width,
rewrapping the unwrapped data contained in each column that originally contained wrapped data; and
resetting the column width of each column containing the rewrapped data to the original column width of the column.

25. The computer-readable storage medium of claim 24 wherein:
when a sum of the column widths of all the columns is less than the specified width, proportionally increasing the column width of each column containing the rewrapped data so that the sum of the column widths of all the columns is equal to the specified width and so that each increased column width is no wider than the width of the longest data of its respective column.

26. A computer-readable storage medium upon which is stored a program for controlling a computer system to perform in accordance with a method for automatically resizing a table, the table having a plurality of columns, each column having a column width and a width of longest data, the method comprising:

for each column in which the column width is different than the width of the longest data,
setting the column width to the width of the longest data; and
unwrapping any wrapped data contained in the column; and when a sum of the column widths of all the columns is less than a specified width, increasing the column width of each blank column so the sum of the column widths of all the columns is equal to the specified width.

* * * * *